(12) United States Patent
Son et al.

(10) Patent No.: US 9,031,416 B2
(45) Date of Patent: *May 12, 2015

(54) APPARATUS AND METHOD FOR SUPPORTING MOBILITY OF A MOBILE TERMINAL THAT PERFORMS VISIBLE LIGHT COMMUNICATION

(71) Applicant: Samsung Electronics Co., Ltd., Gyeonggi-do (KR)

(72) Inventors: Jae-Seung Son, Gyeonggi-do (KR); Do-Young Kim, Gyeonggi-do (KR); Eun-Tae Won, Seoul (KR); Tae-Han Bae, Gyeonggi-do (KR); Young-Kwon Cho, Gyeonggi-do (KR); Sun-Gi Gu, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,998

(22) Filed: Jun. 20, 2013

(65) Prior Publication Data

US 2013/0279917 A1    Oct. 24, 2013

Related U.S. Application Data

(63) Continuation of application No. 12/886,272, filed on Sep. 20, 2010, now Pat. No. 8,488,976.

(30) Foreign Application Priority Data

Sep. 19, 2009 (KR) .................. 10-2009-0088783

(51) Int. Cl.
*H04B 10/00* (2013.01)
*H04B 10/116* (2013.01)
*H04B 10/114* (2013.01)

(52) U.S. Cl.
CPC .......... *H04B 10/116* (2013.01); *H04B 10/1143* (2013.01); *H04B 10/1149* (2013.01)

(58) Field of Classification Search
CPC .. H04B 10/112; H04B 10/114; H04B 10/116; H04B 10/1123; H04B 10/1143
USPC .............................. 398/67, 72, 127, 128, 172
See application file for complete search history.

(56) References Cited

U.S. PATENT DOCUMENTS

| 5,168,575 | A | * | 12/1992 | Cizek et al. .................. 455/514 |
| 8,019,229 | B2 | * | 9/2011 | Fujiwara ....................... 398/172 |
| 2005/0181834 | A1 | | 8/2005 | Chen et al. |
| 2006/0133290 | A1 | | 6/2006 | Lindoff et al. |
| 2007/0269203 | A1 | | 11/2007 | Awazu |
| 2008/0281515 | A1 | | 11/2008 | Ann et al. |
| 2009/0022112 | A1 | | 1/2009 | Shin et al. |

(Continued)

FOREIGN PATENT DOCUMENTS

| CN | 101076082 | 11/2007 |
| JP | 02-002729 | 1/1990 |
| JP | 10-229368 | 8/1998 |
| JP | 2005-206620 | 8/2005 |
| JP | 2005-236667 | 9/2005 |
| JP | 2009-053118 | 3/2009 |
| JP | 2009-110818 | 5/2009 |
| KR | 1020080022298 | 3/2008 |
| KR | 1020080104663 | 12/2008 |
| KR | 1020090009484 | 1/2009 |
| KR | 1020090027942 | 3/2009 |

*Primary Examiner* — Dalzid Singh
(74) *Attorney, Agent, or Firm* — The Farrell Law Firm, P.C.

(57) ABSTRACT

A method and apparatus for supporting mobility of a mobile terminal in a Visible Light Communication (VLC) system. The method includes activating only necessary light sources for VLC considering the mobility of the mobile terminal, instead of using total light sources for VLC. Consequently, power consumption can be significantly reduced.

23 Claims, 12 Drawing Sheets

(56) References Cited

U.S. PATENT DOCUMENTS

| | | |
|---|---|---|
| 2009/0073952 A1 | 3/2009 | Shin et al. |
| 2009/0109913 A1* | 4/2009 | Won et al. ............... 370/329 |
| 2009/0171571 A1 | 7/2009 | Son et al. |
| 2009/0310971 A1 | 12/2009 | Kim et al. |
| 2010/0318656 A1* | 12/2010 | Ferren .................... 709/225 |
| 2011/0026917 A1 | 2/2011 | Li et al. |
| 2011/0044218 A1 | 2/2011 | Kaur et al. |

* cited by examiner

ововArrAPARATUS AND METHOD FOR
SUPPORTING MOBILITY OF A MOBILE
TERMINAL THAT PERFORMS VISIBLE
LIGHT COMMUNICATION

PRIORITY

This application is a Continuation Application of U.S. application Ser. No. 12/886,272 filed in the U.S. Patent and Trademark Office on Sep. 20, 2010, and claims priority under 35 U.S.C. §119(a) to a Korean Patent Application filed in the Korean Intellectual Property Office on Sep. 19, 2009 and assigned Serial No. 10-2009-0088783, the contents of each of which are incorporated herein by reference.

BACKGROUND OF THE INVENTION

1. Field of the Invention

The present invention relates generally to a Visible Light Communication (VLC) system, and more particularly, to an apparatus and method for supporting mobility of a mobile terminal that performs VLC with a VLC device included in the VLC system.

2. Description of the Related Art

As the name implies, VLC refers to wireless communication technology for communication using light in a visible light wavelength band. The VLC is an alternative to a radio frequency-based communication scheme, and has being actively studied with the increased usage of Light Emitting Diodes (LEDs).

FIG. 1 illustrates a conventional Visible Light Communication (VLC) system.

Referring to FIG. 1, the conventional VLC system includes a lighting lamp 100 and a mobile terminal 105. The lighting lamp 100 includes at least one LED 115 or Laser Diode (LD) whose color and illumination intensity can be controlled, such that the lighting lamp 100 provides a lighting function and transmits data received from an Access Point (AP) 110 by using visible light. The mobile terminal 105 includes a VLC transceiver (not shown) to perform data transmission and reception with the lighting lamp 100. The AP 110 is connected with the lighting lamp 100 in order to provide a data service to a user via the lighting lamp 100. A frequency band used in the lighting lamp 100 allows high-speed data transmission. A reception side, i.e., the mobile terminal 105, processes the visible light using, for example, a Photo Diode (PD), thereby performing VLC.

In the conventional VLC system, as illustrated in FIG. 1, only physical mobility is considered. More specifically, the mobile terminal 105 performs VLC under the single lighting lamp 100, so that the VLC is achieved only within a region covered by the lighting lamp 100.

As such, conventionally, a lighting function and a communication function are provided by using all LEDs included in a lighting lamp, which hinders utilization of an advantage of the LED, i.e., low power consumption, because data transmission is performed using the communication function, even in an LED that is located in a region where there is no mobile terminal, thus causing unnecessary power consumption.

Accordingly, in an existing VLC system, the same data is transmitted by all of the light sources without considering the mobility of a mobile terminal, thereby causing unnecessary power consumption.

SUMMARY OF THE INVENTION

The present invention has been designed to solve at least the above-mentioned problems occurring in the prior art.

Accordingly, an aspect of the present invention is to provide an apparatus and method for efficiently supporting mobility of a mobile terminal, thereby providing a seamless VLC service.

In accordance with an aspect of the present invention, a method is provided for supporting, by a VLC device, mobility of a mobile terminal that performs VLC with the VLC device. The method includes exchanging data with the mobile terminal using some of total light sources managed by the VLC device, the mobile terminal being located in a visible light active region, determining whether a response signal indicating a success or failure in data reception is received from the mobile terminal in the visible light active region, extending the visible light active region if the response signal fails to be received in the visible light active region, determining whether the response signal indicating a success or failure in data reception is received from the mobile terminal in the extended visible light active region, and if the response signal is successfully received, setting a new visible light active region based on the response signal-received place.

In accordance with another aspect of the present invention, a method is provided for supporting, by a VLC device, mobility of a mobile terminal that performs VLC with the VLC device. The method includes exchanging data with the mobile terminal using at least one of a plurality of sectors, each of sectors including a predetermined number of light sources, the mobile terminal being located in a visible light active region, determining whether a response signal indicating a success or failure in data reception is received from the mobile terminal in the visible light active region, changing the at least one sector if the response signal fails to be received in the visible light active region, determining whether the response signal indicating a success or failure in data reception is received from the mobile terminal in a visible light active region of the changed sector, and if the response signal is successfully received, setting a new visible light active region based on the response signal-received place.

In accordance with another aspect of the present invention, an apparatus is provided for supporting mobility of a mobile terminal that performs VLC. The apparatus includes a light source manager for managing information about each of a plurality of light sources and determining a number of the plurality of light sources to be activated for VLC, a light source on/off controller for providing a VLC function to the some light sources among the total light sources, and a controller for exchanging data with a mobile terminal capable of performing VLC by using the some light sources, the mobile terminal being located in a visible light active region, determining whether a response signal indicating a success or failure in data reception is received from the mobile terminal in the visible light active region, extending the visible light active region by increasing the number of light resources to be activated by the light source manager if the response signal fails to be received in the visible light active region, determining whether the response signal indicating a success or failure in data reception is received from the mobile terminal in the extended visible light active region, and if the response signal is successfully received, setting a new visible light active region based on the response signal-received place.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF THE EMBODIMENTS OF THE INVENTION

Figure 1:
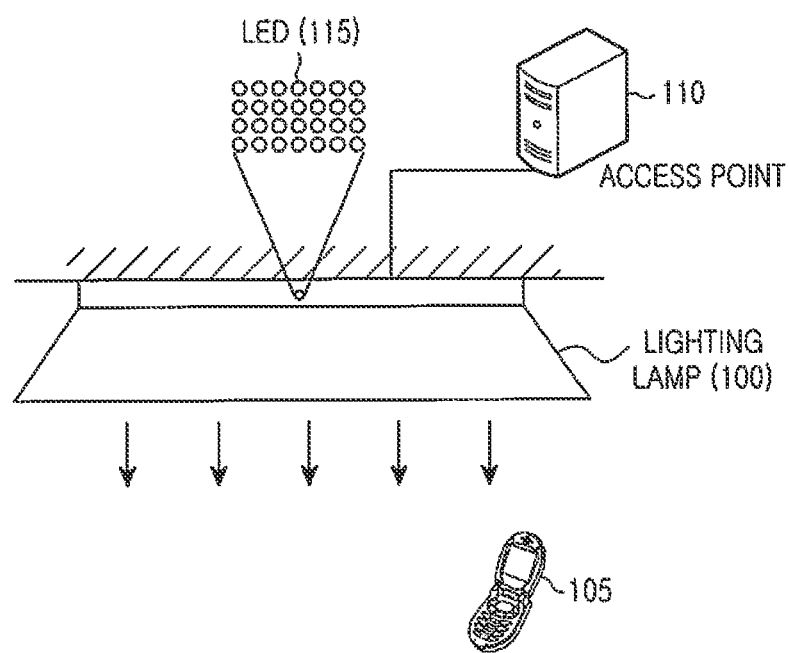
FIG. 1 illustrates a conventional Visible Light Communication (VLC) system.

Hereinafter, various embodiments of the present invention will be described in detail with reference to the accompanying drawings. Throughout the drawings, like reference numerals and symbols refer to like elements. The detailed descriptions of functions and configurations incorporated herein that are well known to those skilled in the art will be omitted to avoid unnecessarily obscuring the present invention.

Although terms defined in a VLC field will be used to describe the present invention, such a standard and designations do not limit the scope of the present invention.

In accordance with an embodiment of the present invention, while exchanging data with a mobile terminal entering a cell managed by a VLC system connected to an individual lighting lamp, and if receiving a response signal corresponding to a failure in data reception from the mobile terminal, the VLC system increases the number of light sources of the lighting lamp to be activated for VLC and then determines a visible light active region based on a point in time when a signal indicating normal data reception is received from the mobile terminal. Alternatively, a visible light active region may be determined in sector units, where each sector includes a predetermined number of light sources. Accordingly, by transmitting data using some of the available light sources of a VLC device in consideration of movement of the mobile terminal, rather than by using all of the available light sources, power consumption is more efficiently managed.

Figure 2:
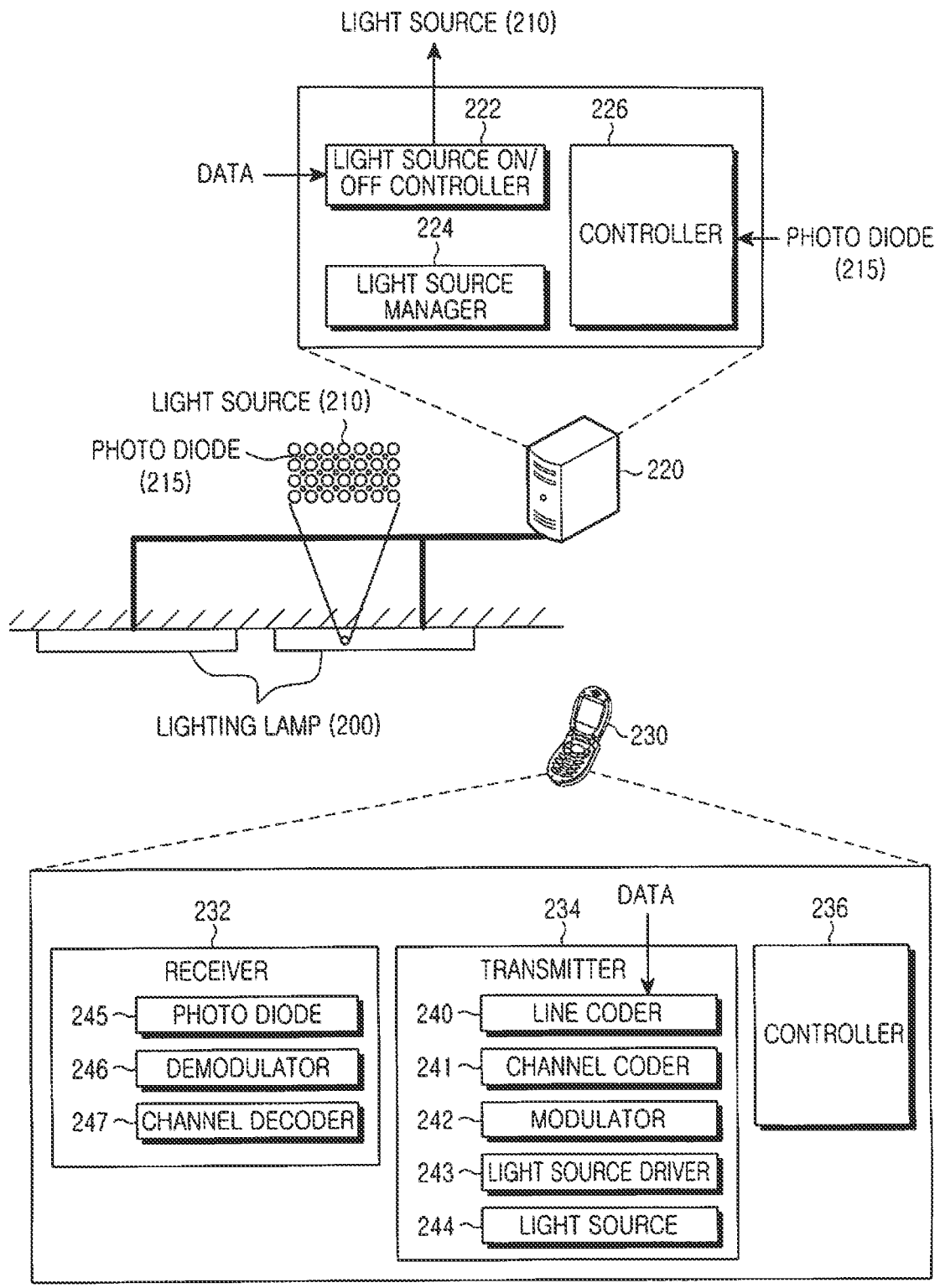
FIG. 2 illustrates a VLC system according to an embodiment of the present invention.

FIG. 2 illustrates a VLC system according to an embodiment of the present invention.

Referring to FIG. 2, the VLC system includes a lighting lamp 200, a VLC device 220 that is connected to each of the lighting lamp 220 and performs VLC with a mobile terminal 230, and the mobile terminal 230.

The lighting lamp 200 includes a plurality of light sources 210 and a Photo Diode (PD) 215 for detecting a signal from the mobile terminal 230. The lighting lamp 200 provides a general lighting function and also serves as a transmitter for transmitting a signal. The light source 210 may be, for example, an LED or a Laser Diode (LD).

An embodiment of the present invention proposes a spatial mobility function for transmitting data using some of the available light sources of the light lamp 200, taking account of mobility of the mobile terminal 230, instead of merely using all of the available light sources. Accordingly, the VLC device 220 according to an embodiment of the present invention is connected with the lighting lamp 200 to manage the light sources of the lighting lamp 200 (or several sectors of the lighting lamp 200, each sector including a predetermined number of light sources). The VLC device 220 may be, for example, an Access Point (AP) for VLC. The VLC device 220 provides a data service to the mobile terminal 230 located in a sector including the light sources 210 of the lighting lamp 200 and having a predetermined number of light sources. As such, by using only a sector necessary for VLC based on movement of the mobile terminal 230, power consumption can be reduced.

The VLC device 220 includes a light source on/off controller 222, a light source manager 224 for managing the light sources of the lighting lamp 200, and a controller 226 for determining whether the mobile terminal 230 enters a cell managed by the controller 226, recognizing a request for activating a spatial mobility function from the mobile terminal 230 and performing that function.

More specifically, the light source manager 224 has information about sectors of lighting lamps managed by the VLC device 220 and information about a user in a corresponding sector, and determines, from the information, in which sector a communication function is to be provided to a light source. The light source manager 224 has information about an IDentification (ID) of each light source and an ID of a sector to manage each light source. The light source manager 224 also determines the number of light sources to be activated among total light sources to support the mobility of the mobile terminal 230. Alternatively, the light source manager 224 determines which sector is to be activated if the mobility of the mobile terminal 230 is supported in sector units, wherein each sector includes a predetermined number of light sources.

The light source on/off controller 222 determines in which sector a communication function is to be provided to a light source. Thus, the light source on/off controller 222 transmits transmission data and information about the sector to which the communication function is to be provided to the light source 210, thus allowing signal transmission through the light source 210 of the sector.

The controller 226, upon receiving a Negative ACKnowledgement (NACK) signal indicating a sector change request through the PD 215, determines that the mobile terminal 230 has moved, and provides a communication function to a light source of another sector. More specifically, the controller 226 determines whether a NACK signal corresponding to a failure in data reception has been received, and if the NACK signal has been received, increases the number of light sources to be activated by the light source manager 224 to extend a visible light active region, and determines whether an ACK signal has been received from the mobile terminal 230 in the extended visible light active region. If the ACK signal has been received, the controller 226 changes the visible light active region based on an ACK signal-received place. Such operations of the controller 226 will be described in more detail below with reference to FIGS. 3 and 8.

The mobile terminal 230 includes a receiver 232 for receiving data via the visible light, a transmitter 234, and a controller 236. The receiver 232 includes a PD 245 for converting a visible light signal input from an external source into an electric signal. The PD 245 is installed between light sources 244. The electric signal from the PD 245 is restored to data by a demodulator 246. The data is restored to an original transmitted signal by a channel decoder 247. Although the transmitter 234 and the receiver 232 are included in the mobile terminal 230 in FIG. 2, they may also be provided in the VLC device 220 located on the ceiling as well as in the mobile terminal 230.

The transmitter 234 includes a line coder 240, a channel coder 241, a modulator 242, a light source driver 243, and a light source 244. Input data is converted by the line coder 240 by using various line coding methods, for example, Non Return to Zero (NRZ), 8B10 B, etc. To prevent data loss from occurring in a radio space, the channel coder 241 uses a channel coding scheme. Data modulation is performed by the modulator 242 for data transmission. The modulated data is then input to the light source driver 243, and is converted into light by the light source 244. The light source driver 243 is connected with the light source on/off controller 222 of the VLC device 220 to provide a simple lighting function if data transmission is not required, and to simultaneously provide a function for transmitting a signal from the modulator 242 and the lighting function if data transmission is required.

In accordance with an embodiment of the present invention, while performing VLC with the mobile terminal 230, which enters a cell managed by the VLC device 220, the VLC device 220, upon receiving a NACK signal from the mobile terminal 230, determines that the mobile terminal 230 has moved out of the cell, and therefore, increases the number of light sources used for data transmission. Upon receiving an ACK signal, the VLC device 220 changes a visible light active region based on the ACK signal-received place.

In accordance with another embodiment of the present invention, upon receiving the NACK signal from the mobile terminal, the VLC device 220 determines a sector from among a plurality of sectors (each including a predetermined number of light sources) based on the NACK signal-received place, i.e., the location where the NACK was received. Upon receiving the ACK signal in the determined sector, the VLC device 220 changes the visible light active region based on the ACK signal-received place. Accordingly, a spatial connection method of adjusting the number of light sources or changing active sectors supports the mobility of the mobile terminal, which will be referred to herein as "a spatial mobility function".

Figure 3:
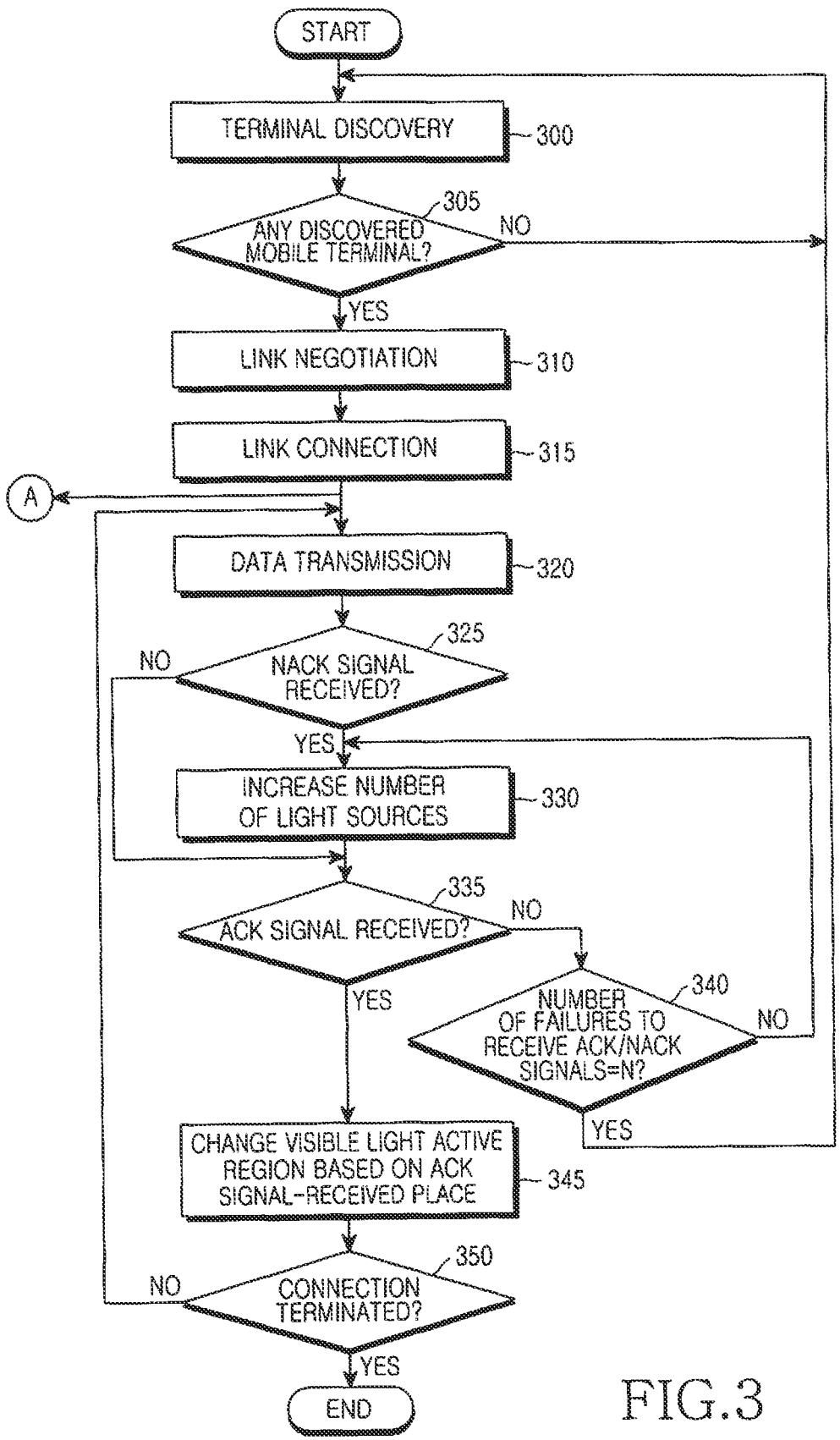
FIG. 3 is a flowchart illustrating a method for supporting mobility of a mobile terminal by adjusting a number of light sources according to an embodiment of the present invention.

FIG. 3 is a flowchart illustrating a method for supporting mobility of a mobile terminal by adjusting a number of light sources according to an embodiment of the present invention.

Referring to FIG. 3, the VLC device 220 performs a terminal discovery operation to discover a mobile terminal that enters a cell managed by the VLC device 220, in step 300. More specifically, the VLC device 220 discovers a mobile terminal that enters a visible light active region, which is lit by a predetermined number of light sources among total light sources managed by the VLC device 220.

In step 305, the VLC device 220 determines whether a mobile terminal has been discovered. If there is no discovered mobile terminal, after an elapse of a predetermined time the VLC device 220 performs another terminal discovery operation in step 300. If a mobile terminal is discovered, in step 310, the VLC device 220 performs a link negotiation operation by exchanging information to perform VLC with the discovered mobile terminal 230. In step 315, the VLC device 220 establishes a communication link to the mobile terminal 230 using the exchanged information.

While the link connection process has been described in terms of the VLC device 220, the same process may be applied to the mobile terminal 230. For example, once entering a region where the lighting lamp 200 is installed, the mobile terminal 230 may determine whether there is any discovered VLC device 220 that performs VLC. If there is the discovered VLC device 220, the mobile terminal establishes a communication link to the VLC device 220.

Upon completion of the link connection, the mobile terminal 230 exchanges data with the VLC device 220 through data transmission in step 320.

Figure 4:
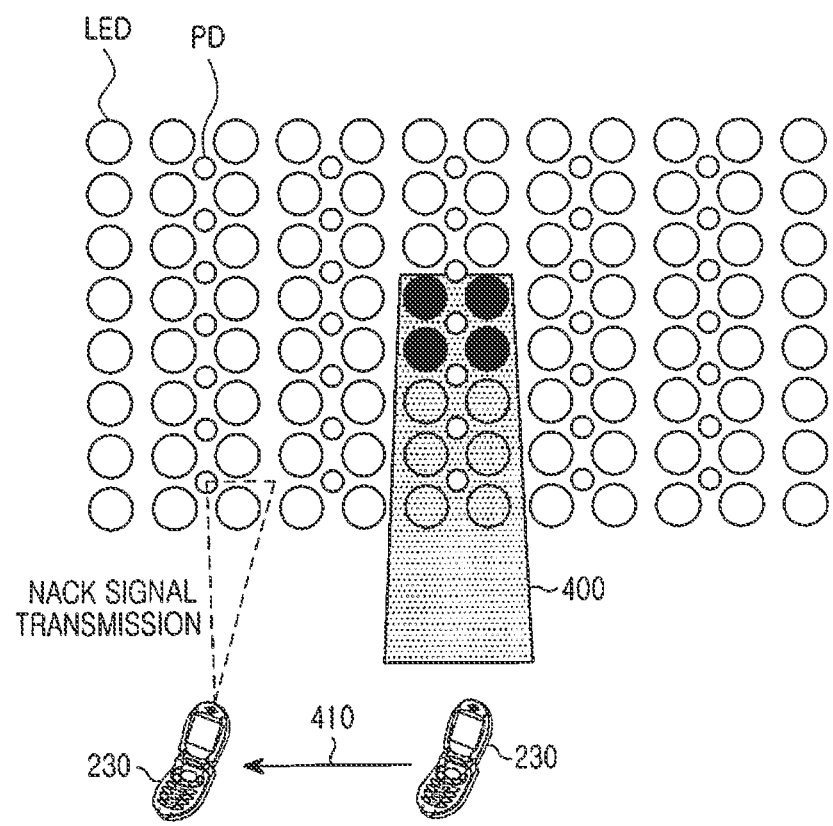
FIGS. 4 through 7 illustrate light sources being activated by movement of a mobile terminal according to an embodiment of the present invention.

For example, as illustrated in FIG. 4, when the mobile terminal 230 is located in a visible light active region 400, the VLC device 220 discovers the mobile terminal 230 and exchanges data with the mobile terminal 230 using visible light. During the data exchange, if the mobile terminal 230 moves in the direction indicated by 410, it moves outside a region managed by the VLC device 220. In this case, the VLC device 220 receives a NACK signal from the mobile terminal 230 in a PD located in a region currently activated for VLC. A NACK signal has been taken as an example of a response signal indicating a failure in data reception in an embodiment of the present invention. The NACK signal is transmitted from the mobile terminal 230 failing to receive data. In accordance with an embodiment of the present invention, the NACK signal is used to request the VLC device 220 to activate the spatial mobility function. In contrast, in accordance with an embodiment of the present invention, an ACK signal is used as a response signal indicating normal reception of data.

An example of a frame header of the NACK signal is shown below in Table 1.

TABLE 1

| | Bit | Notes |
|---|---|---|
| Version number | 3 | Tells version number |
| Secure | 1 | Security on/off |
| ACK policy | 2 | ACK/NACK |
| Frame type | 3 | Visibility/ack/data/management |
| Frame sub-type | 10 | Depend on frame type |
| Retry | 1 | Retransmission or not |
| Source address | 8 | Source address |
| Destination address | 8 | Destination address |
| Sequence number | 12 | PDU number |
| Num PDUs per frame | 8 | Number of packed PDUs |
| Spatial mobility | 4 | Request spatial mobility to AP |
| Reserved fields | ? | |

Referring to Table 1, in accordance with an embodiment of the present invention, the Spatial mobility field of the NACK signal frame is used to request the VLC device 220 to activate the spatial mobility function. That is, the mobile terminal 230 requests the VLC device 220 to change a supportable range of the VLC device 220. The Version number field indicates a standard version of the current frame. The Secure field indicates whether or not a security function is used. The ACK policy field indicates whether or not an ACK policy is used. The Frame type field indicates a type of a frame used in VLC, such as a beacon/visibility/ack/data/management frame. The Frame sub-type field is a value used for an additional function of a frame according to a frame type. The Retry field indicates whether or not retransmission is necessary. The Source address field indicates a source address of a transmitter. The Destination address field indicates an address of a receiver. The Sequence number field indicates a sequence number of a current PDU, and the Num PDUs per frame field indicates the number of PDUs included in the current frame. The Reserved fields field is reserved for subsequent use.

Figure 5:
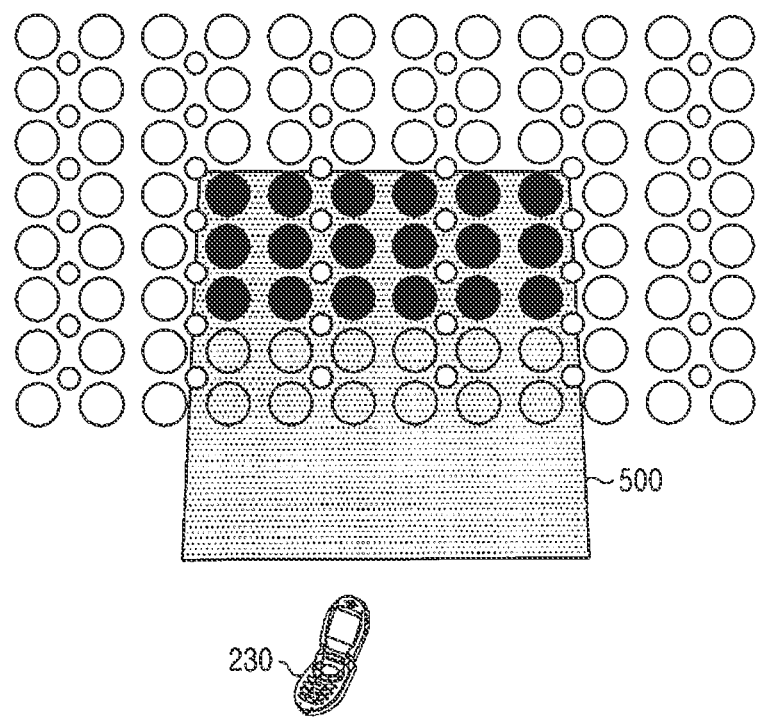

In step 325, the VLC device 220 determines whether the NACK signal has been received, and if yes, the number of light sources for transmitting data is increased in step 330, and as illustrated in FIG. 5. The number of light sources for transmitting data is predetermined, and the VLC device 220 may increase the number of light sources stepwise according to the number of failures to receive the NACK signal and/or the ACK signal. By increasing the number of light sources in a stepwise manner, a visible light active region 500 is extended as illustrated in FIG. 5. Herein, the visible light active region is a region lit by the activated light sources. The size of the visible light active region changes according to the moving direction and speed of the mobile terminal 230.

In step 335, the VLC device 220 determines whether the ACK signal has been received. If yes, the VLC device 220 determines that the mobile terminal 230 has moved and is located within the visible light active region 500. Thus, the VLC device 220 changes the visible light active region 500 based on the ACK signal-received place in step 345.

Thereafter, unless the connection is terminated at the request of the VLC device 220 or the mobile terminal 230 in step 350, the method returns to step 320.

Figure 6:
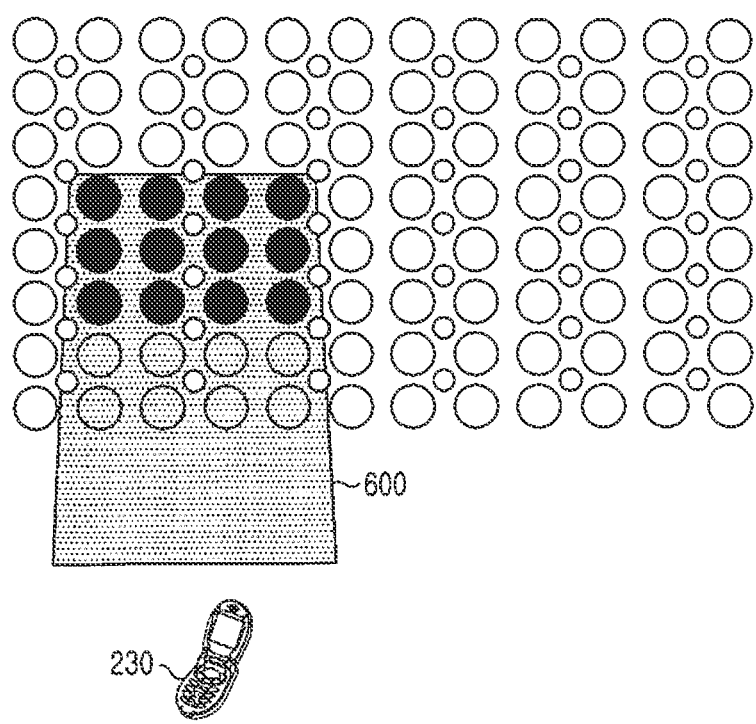

The visible light active region 500 illustrated in FIG. 5 is changed into a visible light active region 600 corresponding to a current location of the mobile terminal 230 as illustrated in FIG. 6, i.e., the visible light active region is extended based on the ACK signal-received place and is lit by an initially predetermined number of light sources. In addition, the size of the visible light active region may change according to the moving direction and speed of the mobile terminal 230.

The VLC device 220 knows a location of a PD that has received the ACK signal, and thus determines a cover region, i.e., the visible light active region 600, based on the location of the PD.

If the ACK signal has not been received in step 335, the number of failures to receive the ACK signal and/or the NACK signal is counted to determine whether the ACK signal and/or the NACK signal fail to be received N times in step 340.

If the number of failures is less than N, the VLC device 220 gradually increases the number of light sources in step 330. However, if the ACK signal and/or the NACK signal fail to be received N times in step 340, the location of the mobile terminal 230 has not been detected. Thus, the VLC device 220 performs another terminal discovery in step 300 and repeats subsequent operations.

More specifically, if the ACK signal and/or the NACK signal fail to be received N times, the VLC device 220 regards the mobile terminal 230 as having moved out of a region supported by the VLC device 220, and thus, repeats a discovery operation for another terminal.

Figure 7:
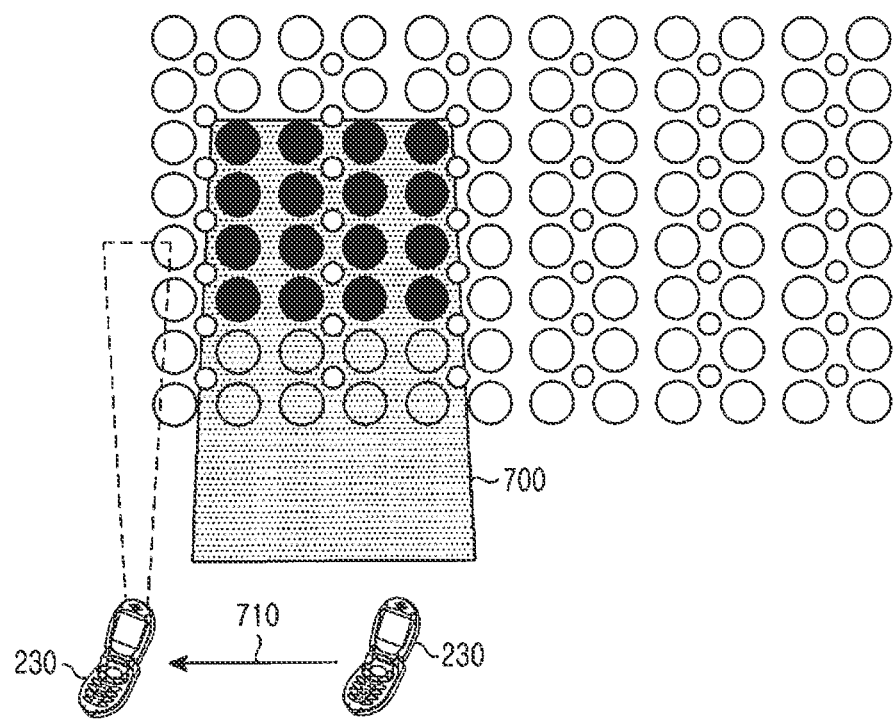

For example, as illustrated in FIG. 7, if the mobile terminal 230 moves in the direction indicated by arrow 710, it moves completely out of a visible light active region 700, resulting in a failure to receive both the ACK signal and the NACK signal by the VLC device 220.

Figure 8:
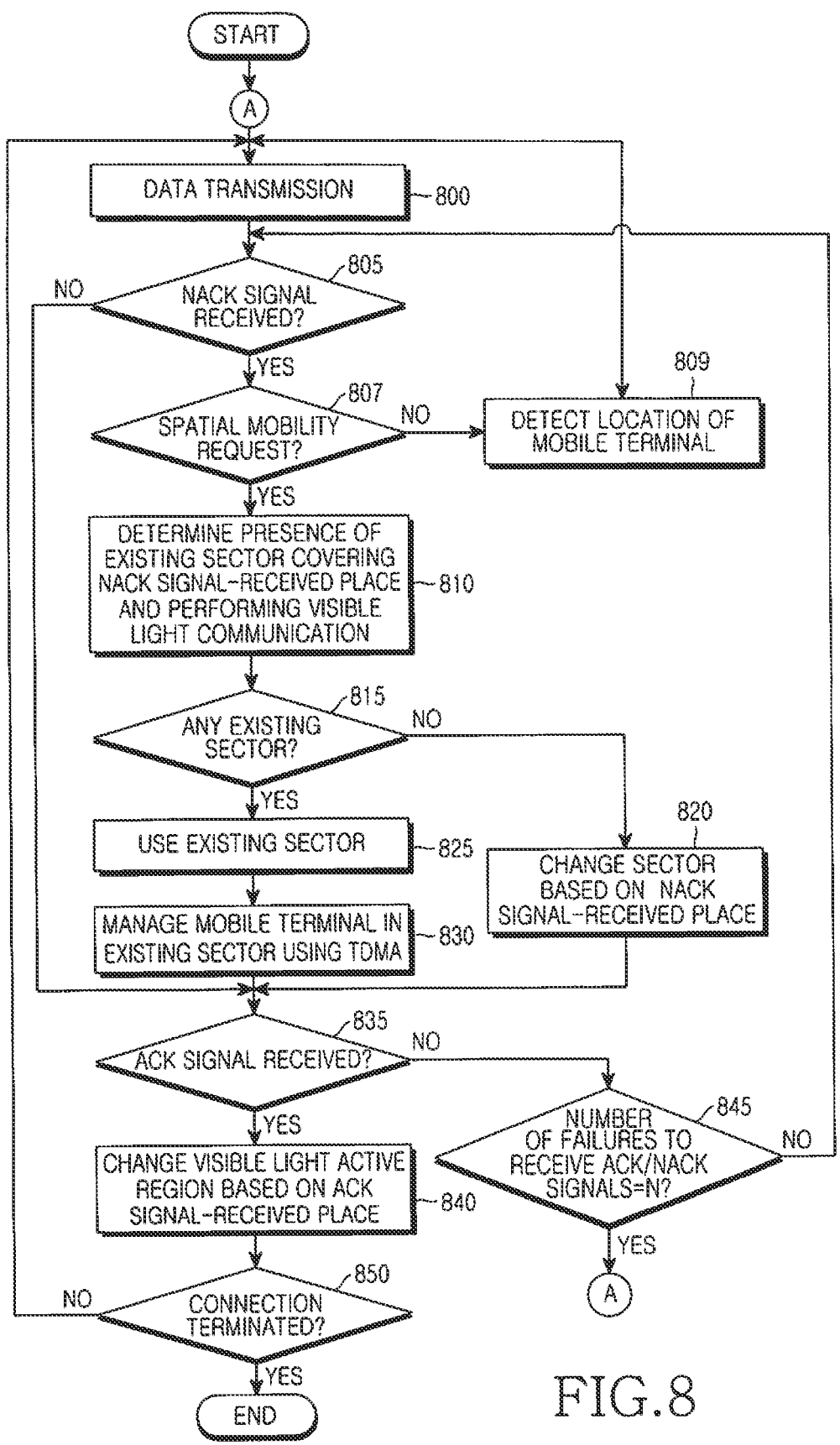
FIG. 8 is a flowchart illustrating a method for supporting mobility of a mobile terminal by changing a sector according to an embodiment of the present invention.

FIG. 8 is a flowchart illustrating a method for supporting mobility of a mobile terminal by changing a sector according to an embodiment of the present invention. In FIG. 8, prior to step 800, steps identical to steps 300 through 315 of FIG. 3, which are indicated by 'A', are performed. However, as these steps have already been described above, FIG. 8 will be described below, starting from step 800.

Figure 9:
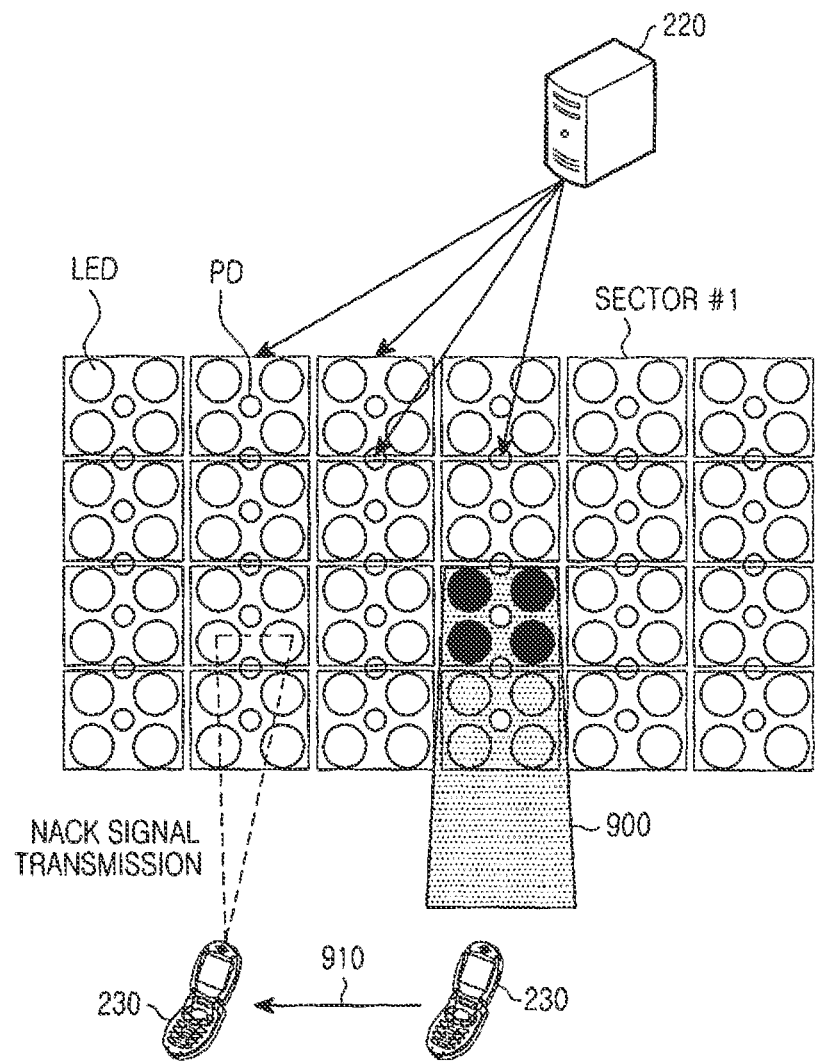
FIGS. 9 through 12 illustrate light sources being activated by movement of a mobile terminal according to an embodiment of the present invention.

Referring to FIG. 8, in step 800, the VLC device 220 performs VLC, such as transmission of data to the mobile terminal 230 in a visible light active region. In accordance with another embodiment of the present invention, as illustrated in FIG. 9, the VLC device 220 manages light sources forming a lighting lamp or for example, an electronic display board, in sector units, wherein each sector includes a predetermined number of light sources, e.g., 4. The VLC device 220 performs VLC with the mobile terminal 230 in a visible light active region that is lit by at least one of the plurality of sectors.

When the mobile terminal 230 is located in a visible light active region 900 lit by a sector, as illustrated in FIG. 9, the mobile terminal 230 exchanges data with the VLC device 220. However, if the mobile terminal 230 moves in the direction indicated by arrow 910, the mobile terminal 230 moves out of the visible light active region 900. The VLC device 220 receives a NACK signal from the mobile terminal 230 in a PD other than the visible light active region 900.

Thus, in step 805, it is determined whether the NACK signal has been received. If yes, in step 807, the VLC device 220 determines whether there is a request for activation of a spatial mobility function from the mobile terminal 230 based on the received NACK signal, e.g., by referring to Table 1. The VLC device 220 checks a MAC header. If it is determined that there is the spatial mobility request by checking the MAC header, the VLC device 220 sets a sector to be activated, taking account of the movement of the mobile terminal 230. In this case, the ACK signal and/or the NACK signal may be received in a PD of the current sector according to movement of the mobile terminal 230, but may also be transmitted in an unintended direction and thus received in a PD of a neighboring sector. Therefore, if the received NACK signal does not indicate the spatial mobility request, a user may have wrongly set the direction of the terminal 230 and thus the NACK signal may have been received in another sector.

In step 809, the VLC device 220 detects the location of the mobile terminal 230. More specifically, the light source manager 224 knows the location of an original sector to which the mobile terminal 230 belongs from the source address field of the MAC header of the received NACK signal. In this case, even if the NACK signal and/or the ACK signal are received in a neighboring sector, the VLC device 220 can continue a data service by using light sources in the original sector based on information included in those signals.

In step 810, the VLC device 220 determines whether there is an existing sector that includes the NACK signal-received place and is performing VLC. More specifically, the VLC device 220 determines a sector of the NACK signal-received place to be a sector including a position to which the mobile terminal 230 moves, so that the VLC device 220 determines whether the sector including the position to which the mobile terminal 230 is in use for VLC with another existing mobile terminal. If the sector has already been activated and used for VLC, the VLC device 220 uses that sector, i.e., the existing sector, without activating a communication function of light sources in the sector.

Figure 10:
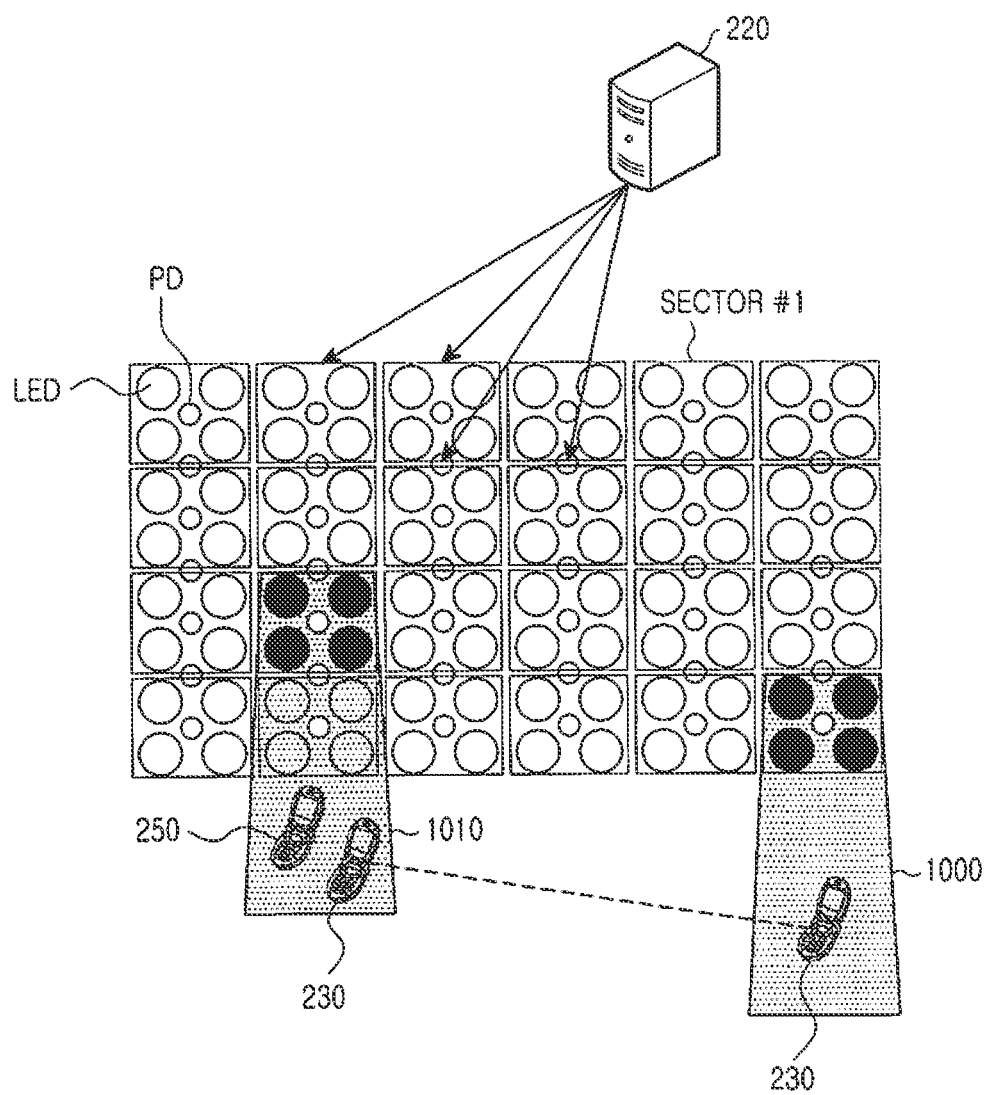

If there is no existing sector in step 815, in step 820, the VLC device 220 changes a sector based on the NACK signal-received place. However, if there is an existing sector in step 815, the VLC device 220 uses the existing sector in step 825, and manages the mobile terminal 230 in the existing sector by using a Time Division Multiple Access (TDMA) scheme in step 830. The TDMA scheme is used to avoid collision, because collision may be likely to occur if VLC is performed with several mobile terminals located in the existing sector. Thus, the VLC device 220 allocates a time slot to each mobile terminal. For example, even when the mobile terminal 230 moves from a visible light active region 1000 to another visible light active region 1010 where another mobile terminal 250 is located, as illustrated in FIG. 10, the mobile terminal 230 can communicate with the VLC device 220 by using the original allocated time slot without interfering with the mobile terminal 250 located in the visible light active region 1010 of the existing sector.

Figure 11:
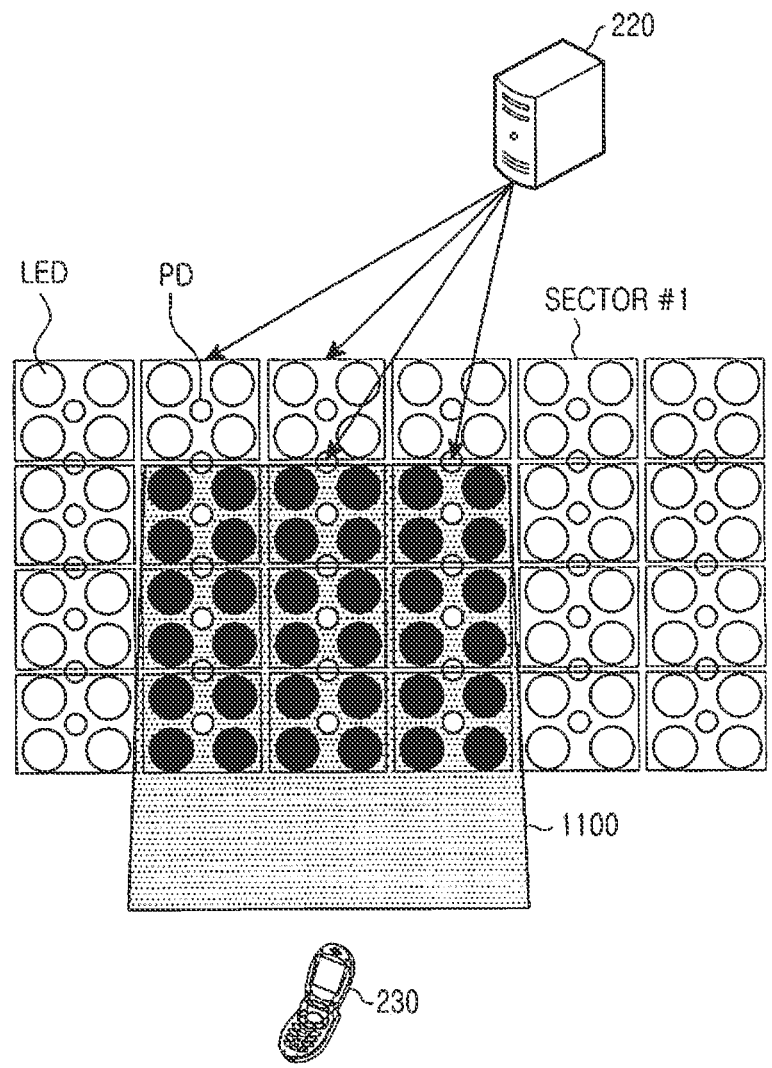

Upon receiving the ACK signal in step 835, the VLC device 220 corrects the visible light active region based on the ACK signal-received place in step 840. However, if the ACK signal and/or the NACK signal fail to be received less than N times in step 845, the VLC device 220 may activate a larger sector to extend a visible light active region 1100, as illustrated in FIG. 11.

Figure 12:
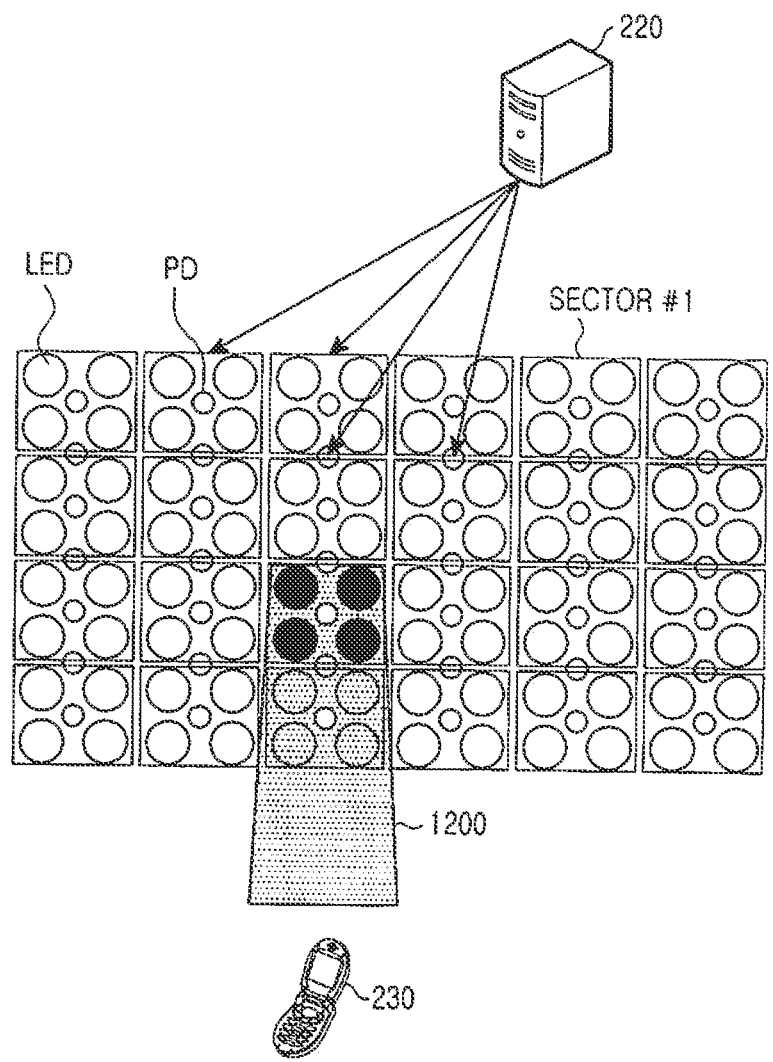

Upon receiving the ACK signal in this state, the VLC device 220 changes a visible light active region 1200 based on the ACK signal-received place as illustrated in FIG. 12. Specifically, the VLC device 220 narrows the visible light active region extended to detect a signal of the mobile terminal 230 to fit it for the location of the mobile terminal 230.

If the ACK signal fails to be received, in spite of change of the visible light active region, the VLC device 220 counts the number of failures to receive the ACK signal and/or the NACK signal to determine whether the number of failures is N in step 845. If the number of failures is N, the VLC device 220 determines that the mobile terminal 230 has moved out of a region managed by the VLC device 220 and g repeats the discovery operation for discovering another terminal at 'A'.

According to an embodiment of the present invention, by activating only necessary light sources for VLC considering the mobility of the mobile terminal, instead of using total light sources for VLC, power consumption can be significantly reduced. Moreover, by continuously determining whether the mobile terminal moves, a seamless data service can be provided.

As can be appreciated from the foregoing description, a seamless continuous communication service of the mobile terminal can be provided and power consumption can be reduced by using only a necessary region, instead of by using all LEDs forming a lighting lamp.

While the present invention has been shown and described with reference to certain embodiments thereof, it will be understood by those skilled in the art that various changes in form and details may be made therein without departing from the spirit and scope of the present invention as defined by the appended claims.

What is claimed is:

1. A mobile terminal for performing Visible Light Communication (VLC), the mobile terminal comprising:
   a transceiver for receiving data from at least one light source of a first cell of a plurality of cells managed by a coordinator; and
   a controller for controlling the transceiver to transmit a response signal in response to receiving the data,
   controlling the transceiver to receive data from at least one light source of a neighboring cell of the first cell if the response signal is not received at the first cell, and
   controlling the transceiver to transmit a response signal in response to the received data from the neighboring cell.

2. The mobile terminal of claim 1, wherein the controller controls the transmitter to transmit a NACK signal indicating a failure to receive data to the first cell.

3. The mobile terminal of claim 1, wherein each of the plurality of cells includes a predetermined number light sources for VLC.

4. The mobile terminal of claim 1, wherein the neighboring cell is adjacent to the first cell.

5. The mobile terminal of claim 1, wherein the controller performs a link negotiation operation and connects the link with the coordinator if a beacon signal is received from the coordinator.

6. The mobile terminal of claim 1, wherein the response signal includes one of an Acknowledgement (ACK) frame and a Color Visible Dimming (CVD) frame.

7. The mobile terminal of claim 1, wherein, when the response signal is not transmitted to the first cell, the first cell is changed to the neighboring cell by the coordinator.

8. The mobile terminal of claim 1, wherein the coordinator counts a number of failures for receiving the response signal if the response signal is not received at the neighboring cell, and changes a search cell to a new neighboring cell and searches for the mobile terminal in the new neighboring cell, if the number of failures exceeds a predetermined threshold.

9. The mobile terminal of claim 1, wherein if the controller communicates with the coordinator in the first cell, the mobile terminal and another mobile terminal are managed by using a Time Division Multiple Access (TDMA) scheme.

10. The mobile terminal of claim 1, wherein the coordinator searches for the mobile terminal in the neighboring cell during a same time slot assigned to the mobile terminal.

11. A method for performing Visible Light Communication (VLC), the method comprising:
    receiving, by a mobile terminal, data from at least one light source of a first cell of a plurality of cells managed by a coordinator;
    transmitting, by the mobile terminal, a response signal in response to receiving the data;
    receiving, by the mobile terminal, data from at least one light source of a neighboring cell of the first cell if the response signal is not received at the first cell; and
    transmitting, by the mobile terminal, a response signal in response to the data from the neighboring cell.

12. The method of claim 11, further comprising:
    transmitting a Negative Acknowledgement (NACK) signal indicating a failure to receive data upon failing to receive the data from the first cell.

13. The method of claim 11, wherein each of the plurality of cells includes a predetermined number light sources for VLC.

14. The method of claim 11, wherein the neighboring cell is adjacent to the first cell.

15. The method of claim 11, further comprising:
    receiving a beacon signal from the coordinator; and
    performing a link negotiation operation and connecting the link with the coordinator if a beacon signal is received from the coordinator.

16. The method of claim 11, wherein the response signal includes one of an Acknowledgement (ACK) frame and a Color Visible Dimming (CVD) frame.

17. The method of claim 11, further comprising:
    counting, by the coordinator, a number of failures for receiving the response signal, if the response signal is not received at the neighboring cell; and
    changing a search cell to a new neighboring cell and searching for the mobile terminal in the new neighboring cell, if the number of failures exceeds a predetermined threshold.

18. The method of claim 11, further comprising:
    managing, by the coordinator, the mobile terminal and another mobile terminal using a Time Division Multiple Access (TDMA) scheme.

19. The method of claim 11, further comprising:
    searching for, by the coordinator, the mobile terminal in the neighboring cell during a same time slot assigned to the mobile terminal.

20. A mobile terminal for performing Visible Light Communication (VLC), the mobile terminal comprising:
    a transceiver for receiving data from at least one light source of a first cell of a plurality of cells managed by a coordinator; and
    a controller for controlling the transceiver to transmit a response signal in response to receiving the data,
    wherein the coordinator searches for a cell in which the response signal is received from the terminal if the response signal is not received in the first cell and sets the searched cell as a serving cell if the response signal is received from the searched cell.

21. The mobile terminal of claim 20, wherein the response signal includes one of an Acknowledgement (ACK) frame and a Color Visible Dimming (CVD) frame.

22. A mobile terminal for performing Visible Light Communication (VLC), the mobile terminal comprising:
a transceiver for receiving data from at least one light source of a first cell of a plurality of cells managed by a coordinator; and
a controller for controlling the transceiver to transmit a response signal in response to receiving the data and controlling the transceiver,
wherein the mobile terminal is searched for in a neighboring cell of the first cell by the coordinator if the response signal is not received at the first cell and the neighboring cell is determined to be a serving cell if the mobile terminal is located in the neighboring cell.

23. The mobile terminal of claim 22, wherein the response signal includes one of an Acknowledgement (ACK) frame and a Color Visible Dimming (CVD) frame.

* * * * *